United States Patent
Dickie et al.

(10) Patent No.: US 6,357,793 B1
(45) Date of Patent: Mar. 19, 2002

(54) ANTI-TIP WHEEL

(75) Inventors: Paul C. Dickie, Clovis; Darryl R. Pauls, Visalia, both of CA (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/430,660

(22) Filed: Oct. 29, 1999

(51) Int. Cl.⁷ .............................................. B60R 21/00
(52) U.S. Cl. ............................ 280/755; 280/124.126; 280/124.128; 280/250.1; 297/310; 16/20
(58) Field of Search .................... 280/124.125, 124.126, 280/250.1, 304.1, 5.2, 242.1, 293, 657, 124.128, 124.132, 755; 180/907, 65.1; 16/20, 29, 32, 34, 37, 48

(56) References Cited

U.S. PATENT DOCUMENTS

| | | | | |
|---|---|---|---|---|
| 490,366 A | * | 1/1893 | Seng | 297/310 |
| 1,478,428 A | * | 12/1923 | Duncan | 280/755 |
| 3,848,883 A | * | 11/1974 | Breacain | 280/5.2 |
| 5,137,295 A | * | 8/1992 | Peek | 280/304.1 |
| 5,531,284 A | * | 7/1996 | Okamoto | 180/65.1 |
| 5,575,348 A | * | 11/1996 | Goertzen et al. | 180/907 X |
| 5,772,237 A | * | 6/1998 | Finch et al. | 180/65.1 X |
| 5,855,387 A | * | 1/1999 | Gill et al. | 280/250.1 X |
| 6,041,876 A | * | 3/2000 | Pulver et al. | 180/65.1 |
| 6,047,979 A | * | 4/2000 | Kraft et al. | 280/250.1 |
| 6,095,271 A | * | 8/2000 | Dickie et al. | 180/907 X |
| 6,135,476 A | * | 10/2000 | Dickie et al. | 280/250.1 |
| 6,145,612 A | * | 11/2000 | Dickie et al. | 180/907 X |
| 6,161,856 A | | 12/2000 | Peterson | 280/250.1 |

FOREIGN PATENT DOCUMENTS

| | | | |
|---|---|---|---|
| JP | 5427121 | * | 3/1979 |
| JP | 9262255 | * | 10/1997 |

* cited by examiner

*Primary Examiner*—Brian L. Johnson
*Assistant Examiner*—Bryan Fischmann
(74) *Attorney, Agent, or Firm*—MacMillan, Sobanski & Todd, LLC

(57) ABSTRACT

A resilient anti-tip wheel suspension includes a wheel coupled to a first mounting bracket. A second mounting bracket is adapted to be rigidly mounted to a wheelchair. Upper and lower bars each have front and rear ends that are pivotally connected to the second mounting bracket and the first mounting bracket, respectively, so as to form a parallelogram configuration.

17 Claims, 4 Drawing Sheets

ANTI-TIP WHEEL

BACKGROUND

Wheelchairs are land vehicles that are provided for transporting the physically impaired. Wheelchairs generally include a base frame supported on a supporting surface by a pair of idler wheels and a pair of drive wheels. The drive wheels may be manually driven by a wheelchair occupant or power driven by motors controlled by the wheelchair occupant. The wheelchair may be maneuvered by differentially driving the drive wheels. The idler wheels are generally in the form of casters which swivel to further enhance the maneuverability of the wheelchair.

The drive wheels have historically been supported by a rear portion of the wheelchair base frame while casters have been supported by a front portion of the wheelchair. However, the drive wheels of late have been supported by a front portion of the base frame as well. The former wheelchairs are commonly referred to as rear-wheel drive wheelchairs while the later wheelchairs are commonly referred to as mid-wheel drive wheelchairs. The casters of rear-wheel drive wheelchairs are typically located towards the front of the base frame. Conversely, the casters of mid-wheel drive wheelchairs are typically located towards the rear of the base frame.

Tipping is an inherent problem with wheelchairs that occurs when accelerating or traversing obstacles. Tipping may also occur in wheelchairs that are provided with reclining seats. Anti-tip wheels are commonly attached to wheelchairs to reduce the risk of wheelchairs tipping over. Anti-tip wheels are usually attached to the rear end of rear-wheel drive wheelchairs and to the front end of mid-wheel drive wheelchairs. In either case, the drive wheels are disposed between the casters and the anti-tip wheels. This may have an undesirable affect on the operation of the wheelchair. For example, if the front casters and the anti-tip wheels each simultaneously encounter an obstacle having sufficient elevation, the drive wheels may lose contact with the ground and thus, lose its ability to move the wheelchair. This could render a wheelchair occupant stranded.

Resilient anti-tip wheel suspensions have been provided in an effort to overcome the foregoing problem. Resilient anti-tip wheel suspensions permit displacement of the anti-tip wheels when obstacles are encountered to reduce the risk of the drive wheels losing contact with the ground. However, resilient anti-tip wheel suspensions have a limited effect on reducing the risk of wheelchairs tipping over when the wheelchairs tip too far rearward. This is especially true for wheelchairs having a reclining seat.

Moreover, resilient anti-tip wheel suspensions commonly rotate about a fixed transverse axis. The fixed transverse axis of rotation may limit the mobility of the wheelchair. For example, anti-tip wheels in the form of casters swivel about an axis to change direction in response to the movement of the wheelchair. As an anti-tip wheel suspension rotates about a fixed transverse axis, the swivel axis may deviate from a vertical orientation. That is to say, as an anti-tip caster changes in elevation, the swivel axis moves along an arcuate path. This causes the caster to lose its ability to swivel. This hinders the wheelchair occupant's ability to negotiate obstacles while changing the direction in which the wheelchair is moving.

A resilient anti-tip wheel suspension is needed that maintains a caster in a substantially vertical orientation throughout movement of the wheelchair over obstacles and uneven terrain.

SUMMARY

This invention is directed towards a resilient anti-tip wheel suspension that maintains a caster in a substantially vertical orientation throughout movement of a wheelchair over obstacles and uneven terrain. The resilient anti-tip wheel suspension comprises a wheel coupled to a first mounting bracket. A second mounting bracket is adapted to be rigidly mounted to a wheelchair. Upper and lower bars each have front and rear ends that are pivotally connected to the second mounting bracket and the first mounting bracket, respectively, so as to form a parallelogram configuration.

Various objects and advantages of this invention will become apparent to those skilled in the art from the following detailed description of the preferred embodiment, when read in light of the accompanying drawings.

DETAILED DESCRIPTION

Figure 1:
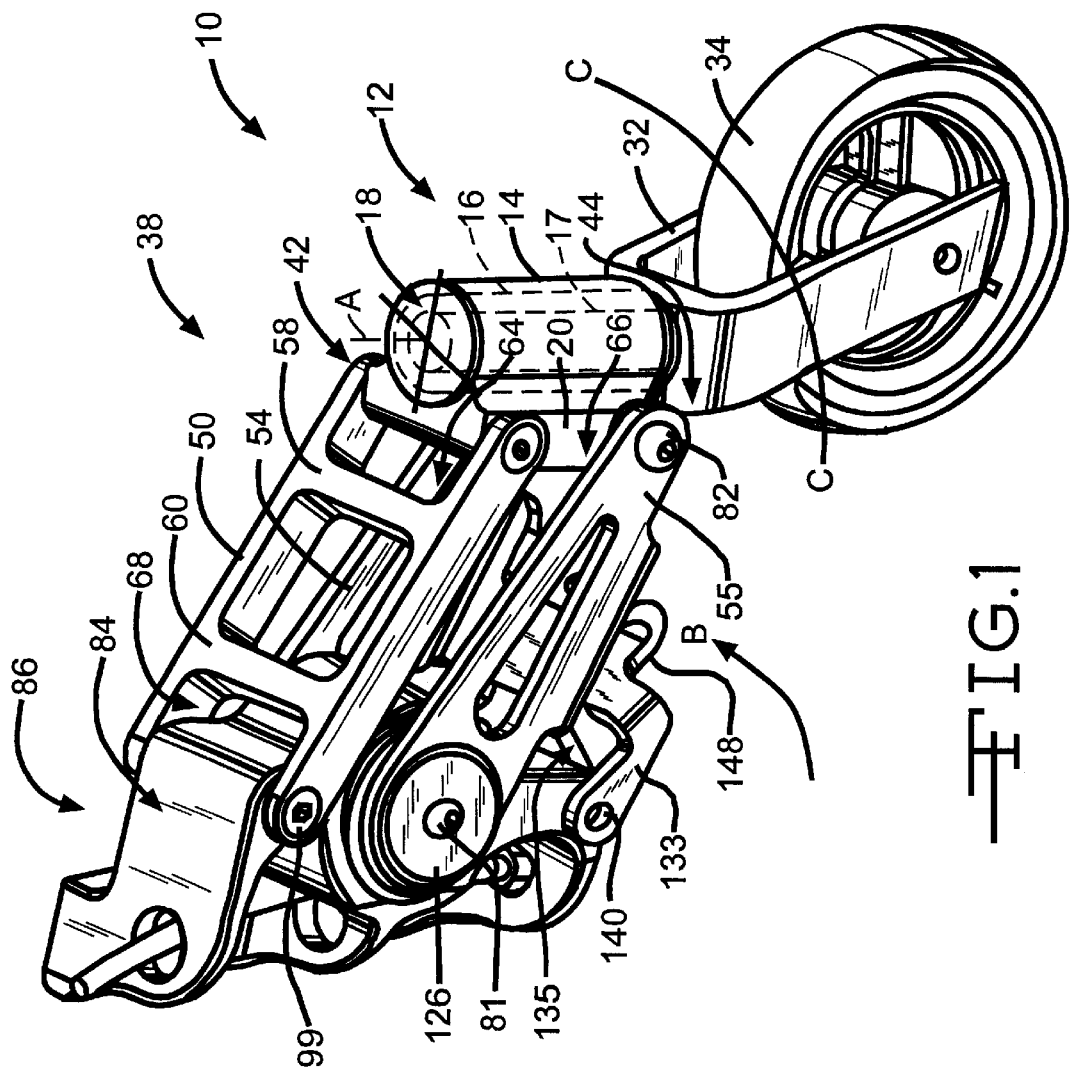
FIG. 1 is a perspective view of a resilient anti-tip wheel suspension.
Figure 2:
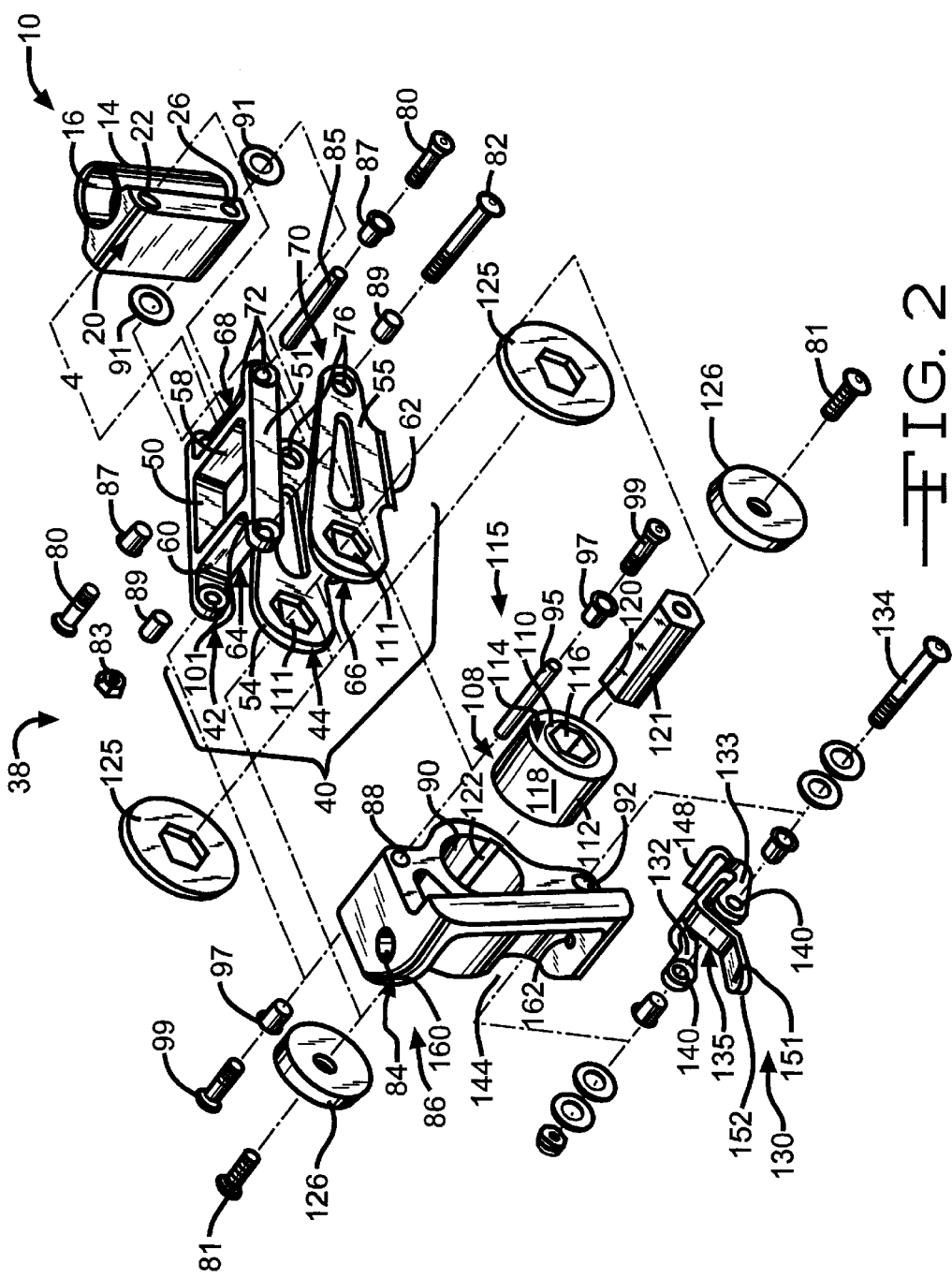
FIG. 2 is an exploded perspective view of the resilient anti-tip wheel suspension shown in FIG. 1.

Referring now to the drawings, there is illustrated in FIGS. 1 and 2 a resilient anti-tip wheel suspension 10 for wheelchairs. The resilient anti-tip wheel suspension 10 includes a caster assembly 12. The caster assembly 12 includes a caster housing 14 having a first cylindrical bore 16. The first cylindrical bore 16 extends along a substantially vertical axis A (shown in FIG. 1) and is provided for pivotally supporting a caster fork stem 17 (shown in hidden line in FIG. 1). The caster fork stem 17 is pivotally supported in the first cylindrical bore 16 by one or more bearings or bushings (also not shown). A cap 18 is preferably removably attached to the caster housing 14 to aid in assembling and disassembling the caster assembly 12. The caster fork stem 17 may be connected to a caster fork 32, which rotatably supports a caster wheel 34.

A first mounting bracket 20 is connected to the caster housing 14. The first mounting bracket 20 includes upper and lower bores 22, 26 (shown in FIG. 2) that extend laterally through the first mounting bracket 20. Alternatively, an upper and lower bore may be provided in each of the opposing side walls of the first mounting bracket 20. The upper and lower bores 22, 26 are horizontal, but are aligned with the upper bore 22 above the lower bore 26 so the they are aligned in a substantially vertical plane. These bores 22, 26 are provided for the connection of a resilient suspension 38, as will become apparent in the description that follows.

The resilient suspension 38 preferably includes a four-bar system 40 that comprises upper and lower bars 42, 44. The upper bar 42 includes opposing upper longitudinal bars 50, 51 and the lower bar 44 includes opposing lower longitudinal bars 54, 55. The opposing upper and lower longitudinal bars 50, 51 and 54, 55 are preferably connected together by upper lateral bars 58, 60 and a lower lateral bar 62. The front and rear ends of the upper and lower longitudinal bars 50, 51 and 54, 55 are spaced apart so as to respectively form upper and lower, front and rear yokes 64, 66 and 68, 70. The upper and lower rear yokes 68, 70 are provided for receiving the first mounting bracket 20 of the caster assembly 12. The upper and lower rear yokes 68, 70 include bores 72, 76 which are adapted to coalign with the bores 22, 26 in the first mounting bracket 20. Pivot pins or fasteners 80, 82 may be inserted into and through the bores 72, 76 and 22, 26 to pivotally couple the rear of the upper and lower bars 42, 44 to the first mounting bracket 20. As shown in FIG. 2, a threaded sleeve 85 may be received by the upper aligned bores 72 and 22 to aid in fastening the upper yoke 68 to the mounting bracket 20. Bushings 87 may be interposed between the threaded sleeve 85 and the upper aligned bores 72 and 22 to reduce frictional contact between upper yoke 68 and the mounting bracket 20. Threaded fasteners 80 may be threadably engageable with the threaded sleeve 85. Bushings 89 and washers 91 (including but not limited to thrush washers) may also be used in assembling the yoke 70 to the mounting bracket 20, as shown in FIG. 2. A fastener 82 may be inserted into and through bushings 89 and washers 91 and further through the aligned lower bores 26, 70. A nut 83 may threadably engage the fastener 82 to assemble the yoke 70 and the mounting bracket 20.

The upper and lower front yokes 64, 66 are provided for receiving the housing 84 of a second mounting bracket 86. The housing 84 includes an upper bore 88 (shown in FIG. 2) and a second cylindrical or intermediate bore 90. The bores 88, 90 may extend laterally through opposing side walls of the housing 84. The upper bore 88 is adapted to coalign with a bore 101 in the upper front yoke 64. A threaded sleeve 95 and opposing bushings 97 may be inserted in the upper bore 88 and the bore 101 in the upper front yoke 64. Threaded fastener 99 may be inserted through the bushings 97 and may threadably engage the sleeve 95 to secure the upper front yoke 64 to an upper portion of the housing 84. The intermediate bore 90 is provided for receiving a torsion elastic element 108. The torsion elastic element 108 may include rigid inner and outer sleeves 110, 112 defining an annular void or chamber 114 therebetween. An elastomeric member 115, such as rubber, may be tightly received in the annular void 114 so as to prevent the inner and outer sleeves 110, 112 from rotating relative to the elastomeric member 115. The inner sleeve 110 defines a laterally extending bore 116 for receiving a pivot pin 121, which will be described in greater detail below. The torsion elastic element 108 may further include an elongate key 120 which extends radially from and laterally along the outer surface 118 of the outer sleeve 112. The key 120 may be engageable with a key way 122 extending laterally along the intermediate bore 90. The engagement of the key 120 and the key way 122 prevents the torsion elastic element 108 from rotating relative to the housing 84.

The inner sleeve 110 of the torsion elastic element 108 is adapted to be matingly engageable with at least one of the lower longitudinal bars 54, 55 so as to remain fixed relative to the lower longitudinal bar 54, 55. In this way, the torsion elastic element 108 will encounter torsional stress upon pivotal movement of the longitudinal bars 54, 55 from a normal position upon encountering a displacement force resulting from the caster wheel 34 traversing an obstacle. In the absence of such force, the torsion elastic element 108 will remain at rest in the normal position. The mating engagement of the inner sleeve 110 and the longitudinal bars 54, 55 may be accomplished in a number of ways. For example, the inner sleeve 110 may be hexagonal in shape and the front end of the longitudinal bars 54, 55 may each be provided with a hexagonally shaped bore 111. A pivot pin 121 may extend through the inner sleeve 110 and beyond the housing 84 to engage the hexagonally shaped bore 111 in the front end of each lower longitudinal bar 54, 55. Opposing inner and outer washers 125, 126 (including but not limited to thrust washers) may be used in conjunction with opposing fasteners 81 to secure the longitudinal bars 54, 55 to the pivot pin 121 and thus pivotally secure the longitudinal bars 54, 55 relative to the torsion elastic element 108 and the housing 84.

Figure 3:
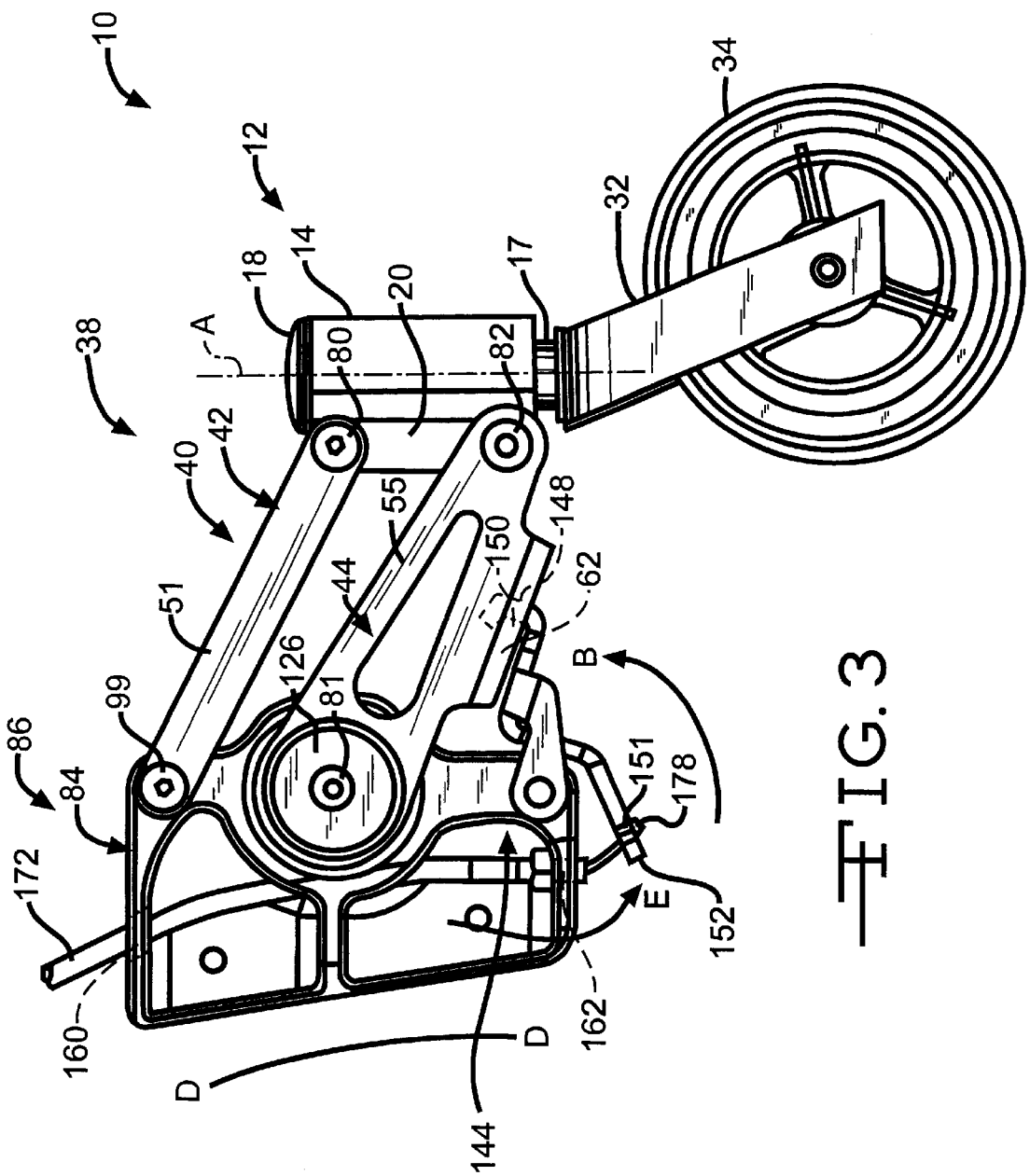
FIG. 3 is a side elevational view of the resilient anti-tip wheel suspension shown in FIGS. 1 and 2 with a four-bar system of the resilient anti-tip wheel suspension displaced upwardly.
Figure 4:
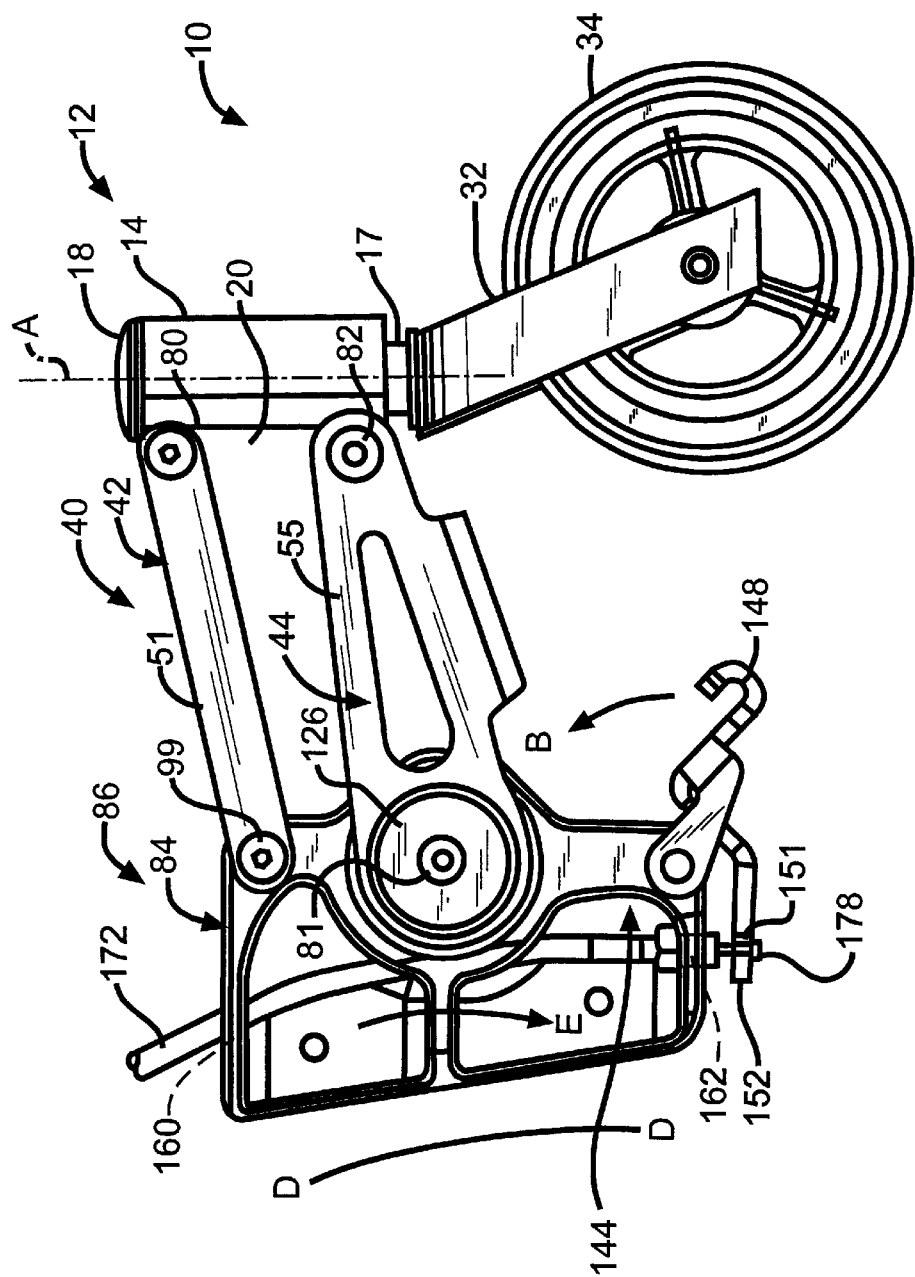
FIG. 4 is a side elevational view of the resilient anti-tip wheel suspension shown in FIGS. 1 through 3 with the four-bar system locked in a stationary position.

The four-bar system 40 described above forms a parallelogram that functions to maintain the axis A (shown in FIGS. 1, 3 and 4) caster fork stem 17 in a substantially vertical orientation as the system 40 encounters displacement resulting from the caster wheel 34 traversing obstacles or rough terrain. The vertical orientation of the axis A of the caster fork stem 17 is maintained throughout the entire movement of the system 40 from a lowered position, such as the lowered position shown in FIG. 3, to a raised position, such as shown in FIG. 4. Maintaining the vertical orientation of the axis A of the caster fork stem 17 permits the caster fork 32 to freely swivel about the axis of the caster fork stem 17 and along the line C—C (shown in FIG. 1). In other words, the resilient anti-tip suspension does not interfere with the operation of the caster fork stem 17 and thus does not interfere with the maneuverability of the wheelchair.

It may be desirable to lock the resilient suspension 38 into a substantially fixed position. For example, it may be desirable to lock the resilient suspension 38 in a fixed position when reclining the seat back beyond a certain point to reduce the risk of the wheelchair tipping over. The resilient suspension 38 may be locked in a substantially fixed position via a number of lock configurations. One such lock configuration is shown in the drawings. This configuration includes a pivotal lockout hook 130. The pivotal lockout hook 130 includes a pair of opposing, laterally spaced longitudinal members 132, 133. The longitudinal members 132, 133 form a yoke 135 therebetween for receiving a lower end of the housing 84. The pivotal lockout hook 130 is pivotally connected to the housing 84 at a lower bore 92 (shown in FIG. 2) passing through a lower end of the housing 84. Coaxial bores 140 passing through the longitudinal members 132, 133 of the pivotal lockout hook 130 are adapted to coalign with the bore 92 passing through the housing 84. The aligned bores 92 and 140 are adapted to receive a pivot pin or fastener 134 for pivotally coupling the pivotal lockout hook 130 to the lower end of the housing 84.

The pivotal lockout hook 130 includes a rearward extending hook 148. The rearward extending hook 148 is displaceable from an unlocked position (shown in FIG. 4) upwardly in the direction of arrow B and into engagement with a rear edge 150 (shown in FIG. 3) of a lateral bar 62 extending between the lower longitudinal bars 54, 55 to lock the resilient suspension 38 into a substantially fixed position (as shown in FIG. 3). The pivotal lockout hook 130 may be manually controlled, or controlled automatically in response to an angular disposition of a reclining wheelchair seat back (not shown). This may be accomplished by coupling a lower end 178 of a cable 172 to a forward extending tongue 152 of the pivotal lockout hook 130. An upper end (not shown) of the cable 172 may be attached to a manually operated lever or an actuator (neither of which are shown) which displaces the cable 172 along the line D—D (shown in FIGS. 3 and 4) in response to a predetermined angular disposition of the reclining wheelchair seat back. A forward portion of the housing 84 may be provided with one or more guides 160, 162, such as the holes shown, through which the cable 172 may pass. The guides 160, 162 may be provided for aligning the lower end 178 of the cable 172 with a captive opening 151 disposed at the forward extending tongue 152 of the pivotal lockout hook 130. As the cable 172 is displaced downward in the direction of arrow E (shown in FIGS. 3 and 4), the tongue 152 is displaceable in a downward direction to urge the rearward extending hook 148 upward in the direction of arrow B and into contact with the rear edge 150 of the lower lateral bar 62. The rearward extending hook 148 limits the travel of the resilient suspension 38 upward to reduce the risk that the reclining wheelchair seat back, and thus the wheelchair, will tip over rearwardly. To unlock the pivotal lockout hook 130, the cable 172 is merely displaced in a direction opposite to the direction of arrow E.

A biasing element, such as a helical spring (not shown), may cooperate with the pivotal lockout hook 130 to provide a biasing force to assist the cable 172 in displacing the pivotal lockout hook 130 upward in the direction of arrow B. Such a spring may be located within a hollow portion 144 of the housing 84. Alternatively, the spring may be disposed between the bottom surface of the housing 84 and the forward extending tongue 152.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A resilient anti-tip wheel suspension for a wheelchair comprising:
    a wheel coupled to a first mounting bracket;
    a second mounting bracket adapted to be rigidly mounted to a wheelchair; and
    an upper bar and a lower bar each having front and rear ends pivotally connected to the second and first mounting brackets, respectively, so as to form a parallelogram configuration, the upper and lower bars forming a four-bar system, wherein the upper bar comprises upper longitudinal bars and the lower bar comprises opposing lower longitudinal bars, the opposing upper longitudinal bars being connected together by at least one upper lateral bar, the opposing lower longitudinal bars being connected together by at least one lower lateral bar.

2. A resilient anti-tip wheel suspension for a wheelchair comprising:
    a wheel coupled to a first mounting bracket;
    a second mounting bracket adapted to be rigidly mounted to a wheelchair; and
    an upper bar and a lower bar each having front and rear ends pivotally connected to the second and first mounting brackets, respectively, so as to form a parallelogram configuration, wherein one end of one of the bars is connected to one of the mounting brackets via a torsion elastic pivotal connection.

3. A resilient anti-tip wheel suspension for a wheelchair comprising:
    a wheel coupled to a first mounting bracket;
    a second mounting bracket adapted to be rigidly mounted to a wheelchair; and
    an upper bar and a lower bar each having front and rear ends pivotally connected to the second and first mounting brackets, respectively, so as to form a parallelogram configuration, wherein the front end of the lower bar is connected to the second mounting bracket via a resilient pivotal connection, said resilient pivotal connection being comprised of a cylindrical bore extending laterally through the second mounting bracket, the cylindrical bore being adapted to receive a torsion elastic element.

4. The resilient anti-tip wheel suspension of claim 3 wherein the torsion elastic element includes a rigid inner sleeve and a rigid outer sleeve defining an annular void therebetween for receiving an elastomeric member.

5. The resilient anti-tip wheel suspension of claim 4 wherein the elastomeric member is rubber.

6. The resilient anti-tip wheel suspension of claim 4 wherein the outer sleeve includes an outer surface and a key extending radially from the outer surface, and wherein the cylindrical bore has a key way, the key being engageable with the key way to prevent the torsion elastic element from rotating relative to the second mounting bracket.

7. The resilient anti-tip wheel suspension of claim 4 wherein the inner sleeve of the torsion elastic element is adapted to matingly engage at least one of the longitudinal bars so as to remain fixed relative thereto.

8. The resilient anti-tip wheel suspension of claim 7 wherein the resilient pivotal connection further includes a hexagonally shaped pivot pin, the inner sleeve being hexagonally shaped and the longitudinal bar having a hexagonally shaped bore, the hexagonally shaped pivot pin being received by the hexagonally shaped inner sleeve and the hexagonally shaped bore.

9. A resilient anti-tip wheel suspension for a wheelchair comprising:
    a wheel coupled to a first mounting bracket;
    a second mounting bracket adapted to be rigidly mounted to a wheelchair;
    an upper bar and a lower bar each having front and rear ends pivotally connected to the second and first mounting brackets, respectively, so as to form a parallelogram configuration; and
    a pivotal lockout hook pivotally connected to the second mounting bracket, the pivotal lockout hook including a hook, the hook being displaceable into engagement with a the lower bar.

10. The resilient anti-tip wheel suspension of claim 9 wherein the lower bar includes two longitudinal bars and a lateral bar extending between the two longitudinal bars, the hook being engageable with the lateral bar.

11. The resilient anti-tip wheel suspension of claim 9 wherein the pivotal lockout hook includes a pair of laterally spaced longitudinal members forming a yoke for receiving a lower end of the second mounting bracket.

12. The resilient anti-tip wheel suspension of claim 11 further including a bore passing through a lower end of the second mounting bracket, the laterally spaced longitudinal members having a bore passing therethrough and being adapted to coalign with the bore passing through a lower end of the second mounting bracket, the aligned bores being adapted to receive a pivot pin for pivotally coupling the pivotal lockout hook to the lower end of the second mounting bracket.

13. The resilient anti-tip wheel suspension of claim 9 wherein the pivotal lockout hook is adapted to be manually controlled.

14. The resilient anti-tip wheel suspension of claim 9 wherein the pivotal lockout hook is adapted to be controlled automatically in response to an angular disposition of a reclining wheelchair seat back.

15. A resilient anti-tip wheel suspension for a wheelchair comprising:

a caster assembly including a caster housing and a first mounting bracket, the housing pivotally supporting a rotatable wheel;

a four-bar suspension system including two upper bars and two lower bars, the upper bars being connected together by an upper lateral bar and forming front and rear upper yokes, the lower bars being connected together by a lower lateral bar and forming front and rear lower yokes, the first mounting bracket being pivotally connected to the upper and lower rear yokes; and a second mounting bracket including a housing, the second mounting bracket being adapted to be mounted to a wheelchair, the second mounting bracket housing including a cylindrical bore, a torsion elastic element being adapted to be received by the bore, the second mounting bracket housing being pivotally connected to the upper and lower front yokes so as to form a parallelogram structure, the second mounting bracket housing being pivotally connected to the lower front yoke via the torsion elastic element.

16. The resilient anti-tip wheel suspension of claim 15 further including a pivotal lockout hook pivotally connected to a lower end of the second mounting bracket housing, the pivotal lockout hook including a hook, the hook being displaceable into engagement with the lower lateral bar.

17. The resilient anti-tip wheel suspension of claim 16 wherein the pivotal lockout hook is adapted to be controlled automatically in response to an angular disposition of a reclining wheelchair seat back.

* * * * *